(12) United States Patent
Starks

(10) Patent No.: US 8,572,089 B2
(45) Date of Patent: Oct. 29, 2013

(54) ENTITY CLUSTERING VIA DATA SERVICES

(75) Inventor: Kimberly Starks, Fairfield, OH (US)

(73) Assignee: Business Objects Software Ltd., Dublin (IE)

(*) Notice: Subject to any disclaimer, the term of this patent is extended or adjusted under 35 U.S.C. 154(b) by 42 days.

(21) Appl. No.: 13/327,587

(22) Filed: Dec. 15, 2011

(65) Prior Publication Data

US 2013/0159305 A1 Jun. 20, 2013

(51) Int. Cl.
*G06F 7/00* (2006.01)
*G06F 17/30* (2006.01)

(52) U.S. Cl.
USPC ............................................. 707/739

(58) Field of Classification Search
USPC ................................................. 707/738, 739
See application file for complete search history.

(56) References Cited

U.S. PATENT DOCUMENTS

| | | | |
|---|---|---|---|
| 5,926,812 A * | 7/1999 | Hilsenrath et al. | 707/737 |
| 6,308,149 B1 * | 10/2001 | Gaussier et al. | 704/9 |
| 2005/0203876 A1 * | 9/2005 | Cragun et al. | 707/3 |
| 2006/0026152 A1 * | 2/2006 | Zeng et al. | 707/5 |
| 2006/0167930 A1 * | 7/2006 | Witwer et al. | 707/102 |
| 2007/0174267 A1 * | 7/2007 | Patterson et al. | 707/5 |
| 2012/0079372 A1 * | 3/2012 | Kandekar et al. | 715/256 |

OTHER PUBLICATIONS

Arge et al. "On sorting Strings in External Memory". 1997. STOC '97 Proceedings of the twenty-ninth annual ACM symposium on Theory of computing. ACM. New York, NY, USA. pp. 540-548.*

* cited by examiner

*Primary Examiner* — James E Richardson
(74) *Attorney, Agent, or Firm* — Schwegman Lundberg & Woessner, P.A.

(57) ABSTRACT

A method is provided for forming an entity cluster. In this method, a plurality of entities found in one or more data sources are identified. An entity may represent a word or a phrase found in the one or more data sources. The plurality of entities may then be organized into groups, where each group has a master entity and a set of subordinate entities. The groups are formed using a first comparison criteria. Then, using a second comparison criteria, a first group is associated with a second group. The second comparison criteria may compare the master entities associated with the first and second groups. Based on the association between the first group and the second group, the method can then determine that the first entity is related to the second entity.

27 Claims, 9 Drawing Sheets

John Smith is the CEO of company XYZ. Mr. Smith has held this position for two years. Mr. Smith is known by his colleagues as either Johnny or John.

In his free time, Mr. Smith enjoys golfing at his local course.

Johnny Smith recommends The Breezy Coast Golf Course.

*FIG. 6*

ENTITY CLUSTERING VIA DATA SERVICES

FIELD

In an example embodiment, the present disclosure relates generally to data processing. In particular, some embodiments may provide analytics of information stored in one or more data sources.

BACKGROUND

Enterprises typically process unstructured information stored in a number of data sources, such as documents, file systems, databases, corpus, and the like. As used herein, "unstructured information" may refer to data that lacks structure that provides a logical, conceptual, or semantic meaning for the data, as may be used for a particular service. For example, a textual document that includes the phrase "cup holder" and the phrase "car cup holder" may lack data that indicates that these two terms actually refer to the same concept of a car cup holder.

In a typical text analytic system, a dictionary that maps terms to concepts may be used to generate analytics that provides structure to the unstructured information. For example, a dictionary may allow an end-user to specify things like "cup holder" and "car cup holder" as the same entity. To broaden the dictionary to cover many terms used in an industry or domain, the end-user may specify mappings for a significant number of terms. Further, the end-user may also spend significant time in maintaining the dictionary or porting the dictionary to other domains.

BRIEF DESCRIPTION OF DRAWINGS

The present disclosure is illustrated by way of example and not limitation in the figures of the accompanying drawings, in which like references indicate similar elements and in which:

FIG. 6 is a diagram showing documents that contain unstructured textual data, in accordance with an embodiment;

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein may provide techniques of analyzing information stored in a number of data sources, such as documents, corpus, databases, file systems, or any other suitable data source. Extracting the entities, such as topics, associated with one or more documents and providing the entities in a form that reduces duplicative entities is an example of analytics that may be performed by embodiments described herein. For example, embodiments may extract the following topics from a corpus: "CUP HOLDER" and "PASSENGER CUP HOLDER." However, from an end-user's perspective, the concepts "CUP HOLDER" and "PASSENGER CUP HOLDER" are duplicative in that the end-user views both topics as references to a "CUP HOLDER." Accordingly, one data service job described herein may the "CUP HOLDER" and "PASSENGER CUP HOLDER" entities into a single group represented, for example, by "CUP HOLDER." In this way, end-users are only exposed to the entity "CUP HOLDER," rather than both "CUP HOLDER" and "PASSENGER CUP HOLDER."

Figure 1:
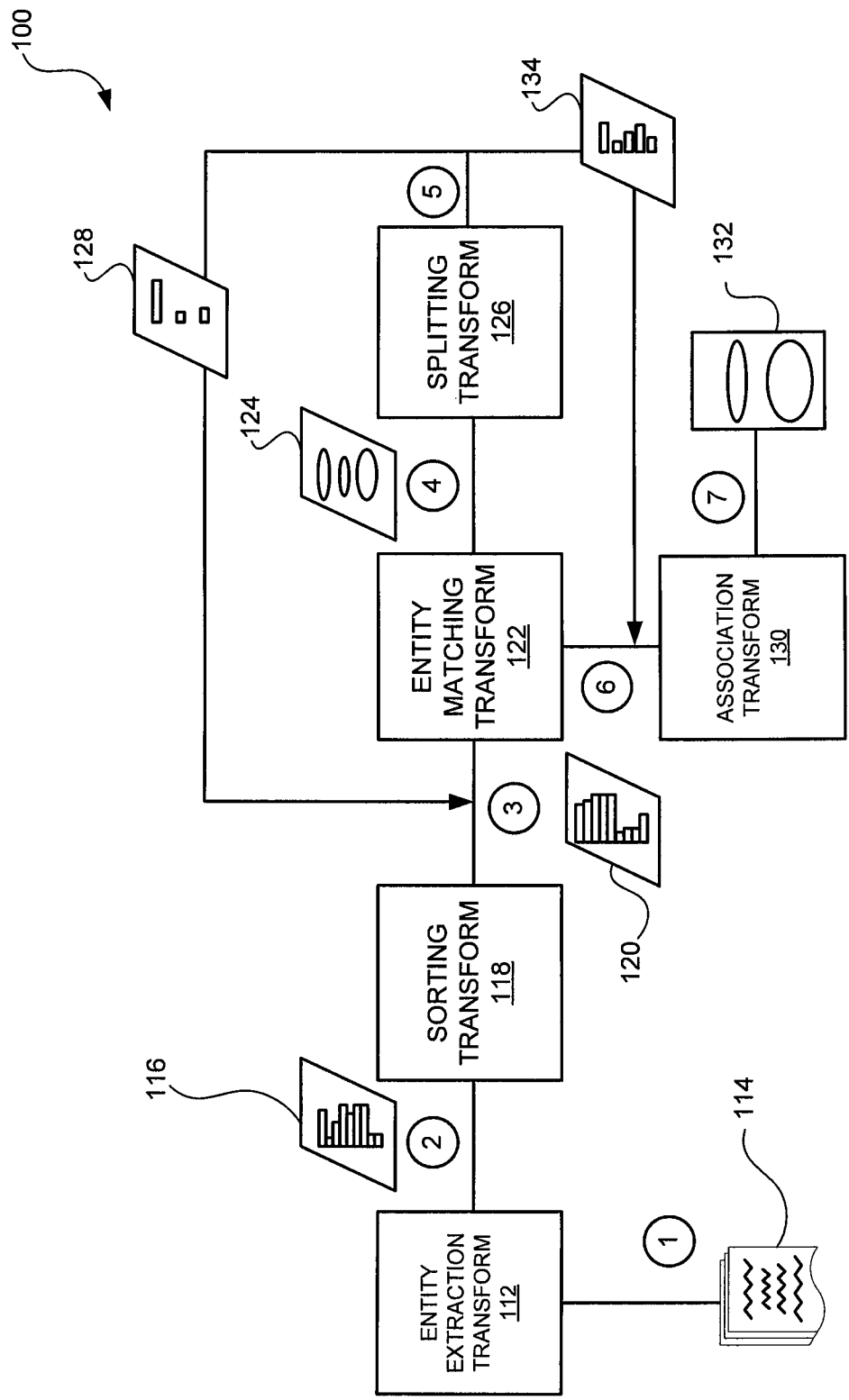
FIG. 1 is a data flow diagram that illustrates a data flow that conceptualizes the general steps of transforming a data set into entity clusters, in accordance with an example embodiment.

FIG. 1 is a data flow diagram that illustrates a data flow 100 that conceptualizes the general steps of transforming a data set (e.g., extracted entities) into entity clusters, as may be performed by example embodiments described herein. In particular, FIG. 1 shows a flow of data through a number of data transforms. A "data transform," as used herein, may generically refer to a function or operation that manipulates a data set according to a predetermined manner. For example, a data transform may receive one or more data sets as input, which are then processed according to an algorithm to create an output dataset. In some embodiments, data transforms may be chained together such that the output of one data transform may be used as the input of another data transform.

Although the function of a data transform may be determined by a data transform type, some embodiments may allow transforms to use operational parameters to control how the particular type of data transform processes a data set. For example, as is described below, a matching transform may be used to break similar entities into groups. To control how a matching transform determines what constitutes a "similar" entity, the matching transform may receive or otherwise use comparison criteria to determine whether one entity is similar to another entity. For example, the matching transform may compare two entities using the comparison criteria to generate a similarity value. The similarity value may be based on comparing possible sub-strings, relative similarity (e.g., a percentage similarity based on characters and or symbols), and data field comparisons. The generated similarity value for the two entities may then be compared to a similarity value threshold to answer the question of whether the two entities are similar. The similarity value threshold, similar to the similarity value, may be represented as a numerical number.

In some embodiments, the similarity value may be generated based on a comparison of the morphemes contained in two or more entities. As used herein, a "morpheme" may refer to a semantically meaningful unit of a language, such as a word or part of a word. For example, the word "unbreakable" may comprise three morphemes: un-, -break-, and -able. In such an example, the morpheme "un-" may provide the semantic meaning of "not," the morpheme "-break-" may provide a root meaning, and the morpheme "-able" may provide the semantic meaning of "doable." Where a particular morpheme appears as part of a word (e.g., in conjunction with a root morpheme), the morpheme may be referred to as a bounded morpheme. Affixes, such as prefixes and suffixes, are examples of bounded morphemes. A semi-suffix (e.g., cat"-like"), infix (e.g., Minne ("flippin")sota), circumfix (e.g., "a"scatter"ed"), interfix (e.g., speed-"o"-meter), duplifix (e.g., teeny~"weeny"), transflix (e.g., a discontinuous affix that interleaves within a discontinuous stem), and the like are examples of other types of bounded morphemes.

The data flow 100 may begin when an entity extraction transform 112 extracts a number of entities from one or more data sources 114. This is shown as step 1. The entity extraction transform 112 may extract entities from the content of the data sources 114 by performing linguistic processing on the content of the data sources 114 to identify terms that refer to people, places, dates, organizations, products, or any other suitable concepts. Data extracted from the data sources may be referred to as entities. The extracted entities may be stored in a table or any other suitable data structure that may be associated with a paragraph, a sentence, a document, and a type. It is to be noted that the data sources 114 may store textual information (letters, numbers, symbols), as well as binary data.

At step 2, the output of the entity extraction transform 112 (e.g., the extracted entities 116) may be used as the input to the sorting transform 118. The sorting transform 118 may be configured to sort the extracted entities 116 in any number of ways. For example, the sorting transform 118 may sort the extracted entities 116 in non-descending order or, in other embodiments, the extracted entities 116 may be sorted according to characteristics of the extracted entities (e.g., based on an average length of the entities). As FIG. 1 shows, the sorted entities 120 may include one portion comprised of sorted entities that meet a determinable criteria (e.g., longer than the average entity) and another portion comprised of sorted entities that meet another determinable criteria (e.g., entities that are equal or shorter than the average entity length).

At step 3, the entity matching transform 122 may break the entities into entity groups 124 based on comparison criteria. According to some embodiments, the entity matching transform 122 may operate by selecting a next entity (e.g., the top entity on the sorted entity list) from the sorted entities. The selected entity is then compared to the remaining entities in the sorted entity list to determine whether a set of the remaining entities match the selected entities. As used herein, a "set" may refer to zero or more entities. The selected entity (e.g., master entity) and set of remaining entities (subordinate entities) form a group. The entities that form the entity group are then removed from the sorted entity list, and the process of selecting the next entity and finding its matches is continued until the sorted entity list is empty.

An "entity group," as used herein, may refer to an association of a master entity and a set (e.g., zero or more) of subordinate entities. As used herein, a "master entity" may refer to an entity within an entity group that is identified as the representative entity for the group. As describe above, a master entity may be identified by being the entity initially selected to form a new group. However, other mechanisms of identifying a master entity may be used. For example, the master entity may be identified as the longest entity in the group. Further, as used herein, a "subordinate entity" may refer to an entity in the group that matches the master entity. In some cases, an entity may not match with any other entities. In such cases, a group may be formed that consists of just a single entity, referred to as a unique entity. To clarify the description herein, a unique entity is also a master entity.

At step 4, the splitting transform 126 is configured to split the master entities 128 from the subordinate entities 134.

At step 5, the master entities 128 may be used by the entity matching transform 122 to form additional groups based on the master entities. The additional groups formed from the master entities may be a refinement of the groups formed from the sorted entities 120. In some embodiments, different operational parameters may be used each time the entity matching transform 122 is performed. This allows the entity matching transform 122 to form groups with varying comparison criteria, as is explained below.

Further, at step 5, the subordinate entities 134 are sent to the association transform 130 to be used to form entity clusters, as is described below.

It is to be appreciated that the steps 3, 4, and 5 of FIG. 1 may be repeated any number of times.

Once the data flow 100 is done forming groups based on the loop involving steps 3, 4, and 5, the association transform 130, after receiving groups of master entities and subordinates entities 134 at step 6, may form cluster groups 132 at step 7. The association transform 130 may form the cluster groups 132 by associating groups with common entities. For example, if a first entity and a second entity are associated with a different group in the first iteration of the steps 3, 4, and 5 but are later associated with the same group in a subsequent iteration of the steps 3, 4, and 5, then the first and second entity may be merged into the same group. FIG. 1 shows the merging of groups in that the entity groups 124 show three groups and the cluster groups 132 show only two groups. Such may be the case where the association transform 130 merges or otherwise associates two groups.

As described above, the sorting transform 118 may be performed before one or more match/split transform loops. It is to be appreciated that the results of a match transform may depend on the order of its input. Such is the case when, for example, the match transform selects the first entity and then finds matches based on the selected entity. If the sorting transform 118 sorts the entities from smallest to largest, the match transform may output a smaller set of groups and a higher number of false positives. For instance, "CONTROL" may be selected as the first entity and matching entities may include "CLIMATE CONTROL," "STABILITY CONTROL," "COMPUTER CONTROL," and "TRACTION CONTROL." However, these matching entities are very different as these entities refer to different areas of the car (e.g., a car's climate control has little to do with the car's stability control). Thus, such coarse clustering may result in confusing or otherwise misleading output for end-users or applications that operate thereon.

To provide better clustering, the sorting transform 118 may sort the extracted entities such that relatively short entities are placed in sorted order at the end of the sorted entities data set while relatively long entities are placed in sorted order at the beginning of the sorted entities data set. This may result in relatively better mappings of entities to groups. For example, "CONTROL" may not be sorted to the top of the list and, as a result, "CLIMATE CONTROL," "STABILITY CONTROL," "COMPUTER CONTROL," and "TRACTION CONTROL" may not be organized under the same group.

After the entities are extracted and grouped, embodiments may provide a number of data service jobs. For example, embodiments may provide topic clustering for feedback data, co-occurrence data, and data normalization.

Figure 2:
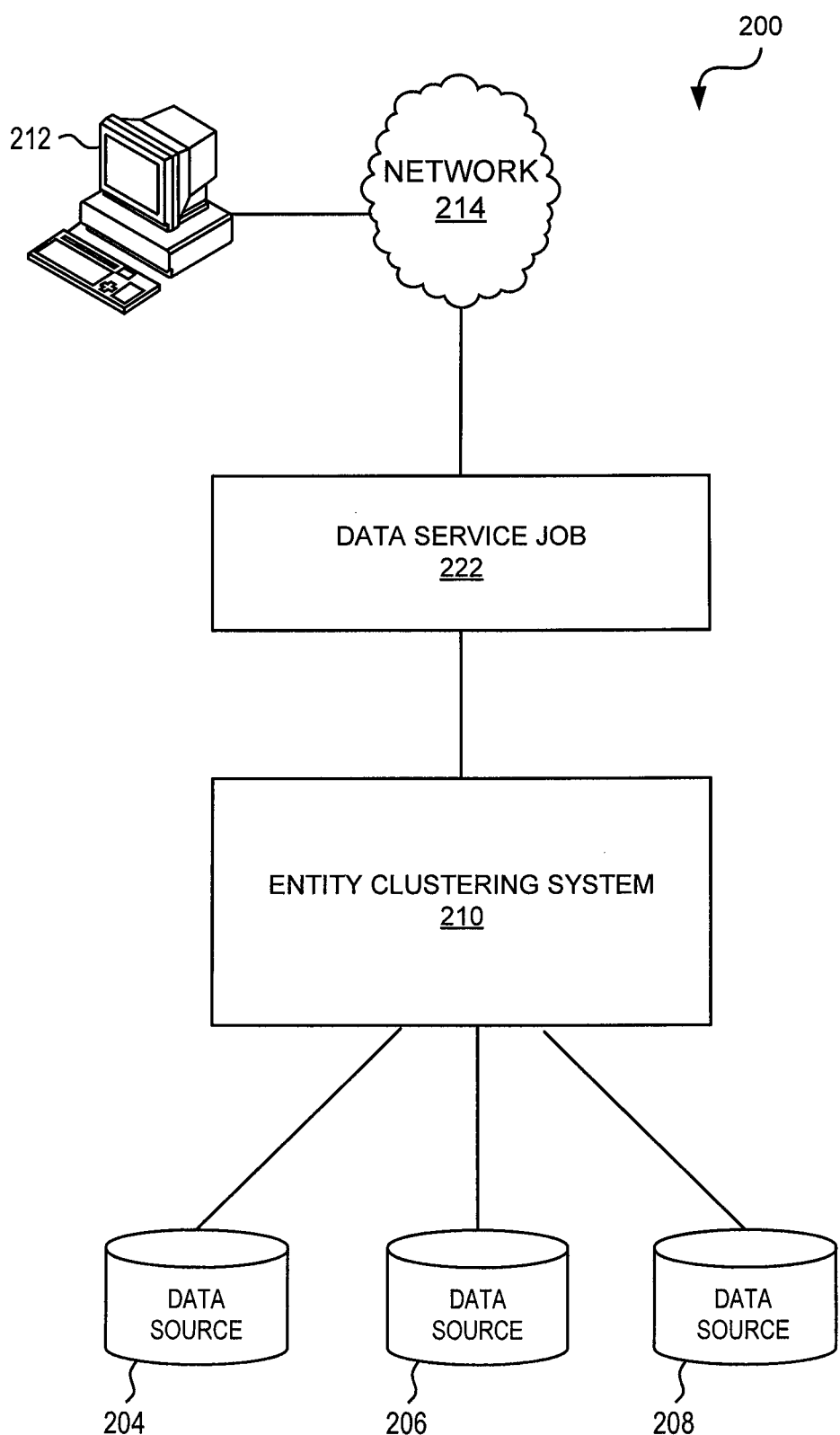
FIG. 2 is a block diagram that illustrates an example of a system 200 for generating entity clusters, in accordance with an example embodiment.

FIG. 2 is a block diagram that illustrates an example of a system 200 for implementing various example embodiments. In some embodiments, the system 200 comprises a client device 212, a network 214, a data service job 222, and an entity clustering system 210. The components of the system 200 may be connected directly or over a network 214, which may be any suitable network. In various embodiments, one or more portions of the network 214 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

Although FIG. 2 illustrates a particular example of the arrangement of the client device 212, the data service job 222, the entity clustering system 210, and the network 214, this disclosure includes any suitable arrangement or configuration of the client device 212, the data service job 222, the entity clustering system 210, and the network 214.

The client device 212 may be any suitable computing device, such as a smart phone, a personal digital assistant, a mobile phone, a personal computer, a laptop, a computing tablet, or any other suitable device. The client device 212 may access the data service job 222 or the entity clustering system 210 directly, via the network 214, or via a third-party system.

The data service job 222 may include a network-addressable computing system that can host one or more services, and may be accessed by the other components of system 200 either directly or via the network 214. The data service job 222 may provide services for data integration, data quality, data profiling, and text data processing that allows users to integrate, transform, improve, and deliver data to business processes. The services provided by the data service job 222 may operate on data sources 204, 206, and 208. In some embodiments, the data sources 204, 206, and 208 store heterogeneous data and applications. Documents, corpus, databases, file systems, or any other suitable data source are examples of data sources. In some embodiments, the data service job 222 may analyze the content stored in the data sources 204, 206, and 208 to provide information management, data integration, data quality analysis, business intelligence, query, analytics, reporting, search, navigation, document, or any other suitable analytics.

In an example embodiment, the data service job 222 may provide a service for terminology normalization. Terminology normalization may process the data sources 204, 206, 208 to replace all occurrences of one or more words or phrases with another word or phrase. Such a service helps with maintaining a consistent vocabulary used within an enterprise.

To perform the services offered by the data service job 222, the data service job may utilize the entity clustering system 210. The entity clustering system 210 may include a network-addressable computing system that provides a number of transforms usable on information related to the data sources 204, 206, 208. For example, the entity clustering system 210 may provide a transform that extracts entities of interest from the data sources 204, 206, 208 and a matching transform to form cluster groups.

Figure 3:
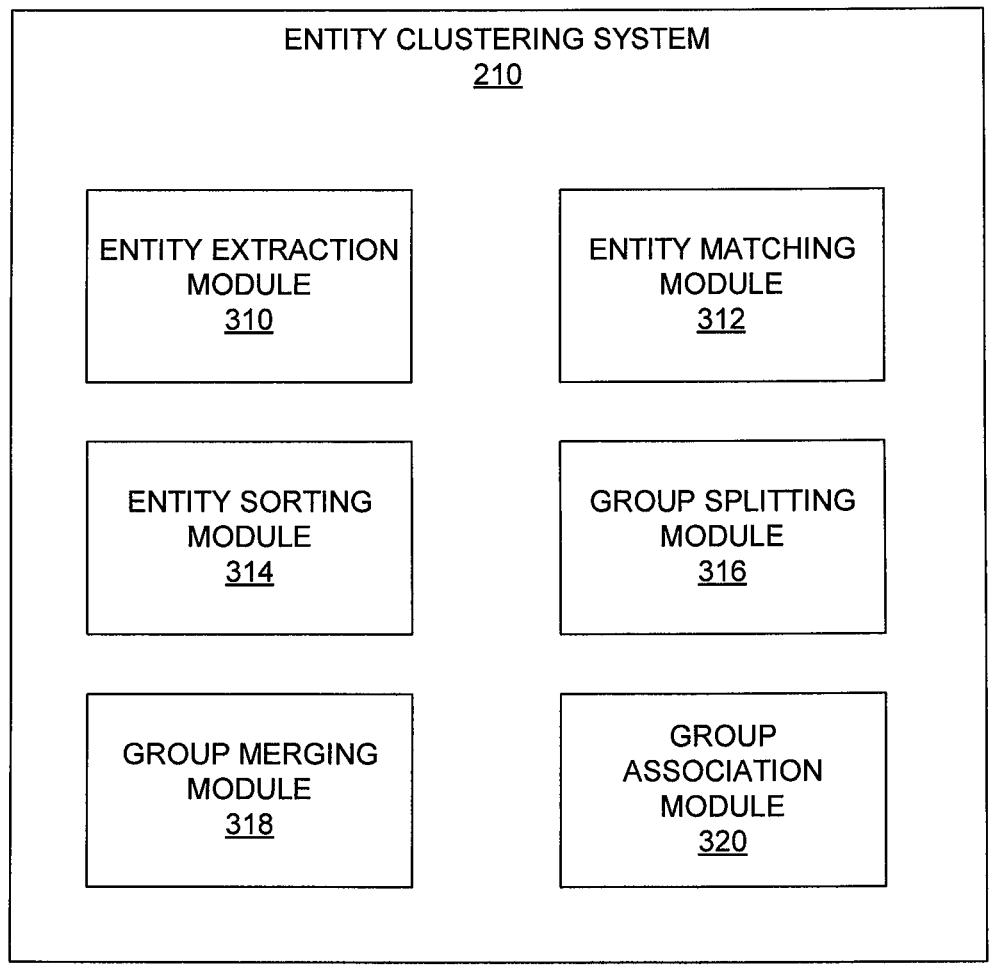
FIG. 3 is a block diagram illustrating example modules of the entity clustering system, in accordance with an embodiment.

FIG. 3 is a block diagram illustrating example modules of the entity clustering system 210 that may perform a number of transforms to form entity clusters of the entities related to one or more data sources. The entity clustering system 210 shown in FIG. 3 includes an entity extraction module 310 to perform entity extraction transforms, an entity matching module 312 to perform match transforms, an entity sorting module 314 to perform sorting transforms, a group splitting module 316 to perform group split transforms, a group merging module 318 to perform merge transforms, and an group association module 320 to perform association transforms. In some embodiments, some or all of the modules of the entity clustering system 210 may be part of the data service job 222 or the client device 212. The modules may be hardware, software, or a combination of hardware and software. In some embodiments, the modules may be implemented by one or more processors of a system (e.g., one or more servers), such as the data service job 222, the entity clustering system 210, or the client device 212. The modules of the entity clustering system 210, and the transforms they perform, are described in further detail with reference to the various operations that determine how entities are grouped together.

Figure 4A:
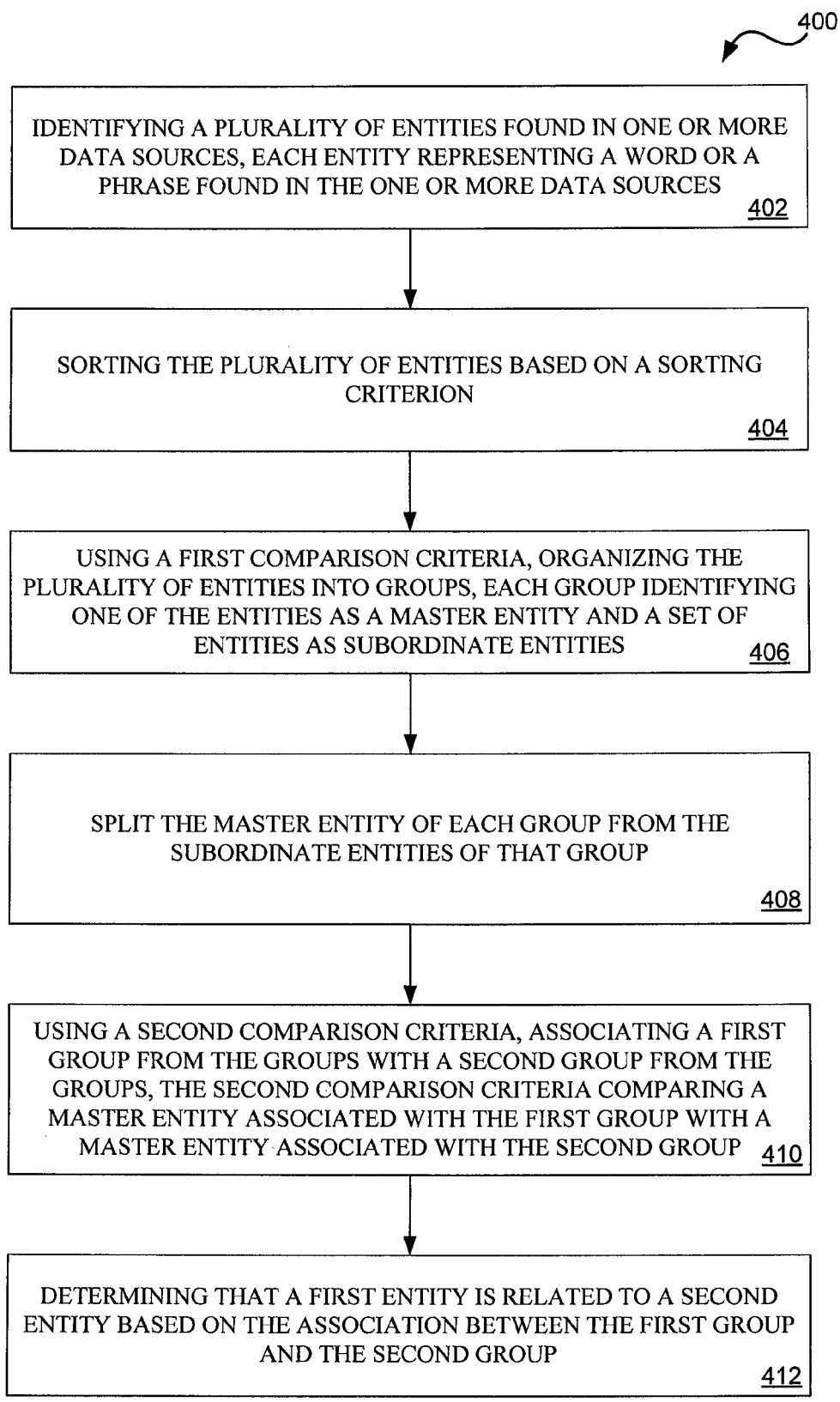
FIG. 4A shows a flowchart illustrating an example method for grouping entities found across data sources, in accordance with an embodiment.

FIG. 4A shows a flowchart illustrating an example method 400 for grouping entities found across data sources. In some embodiments, method 400 may be performed using the modules of the entity clustering system 210.

At operation 402, the method 400 may begin by identifying a plurality of entities found in the data sources. That is, the method 400 may find two or more entities stored in the data sources. As described above, an entity may be a data structure that identifies a person, place, date, product, organization, or any other suitable concept that is represented from datum (e.g., textual or binary data) extracted from the data sources in plural or singular form. Such an extraction may be performed by the entity extraction module 310. For example, the entity extraction module 310 may be a text analyzer that analyzes text and automatically identifies and extracts entities. In some embodiments, the text analyzer may look for patterns, activities, events, and relationships among entities and enables their extraction. Extracting such information from text may provide useful information that suggests the topics of a document.

At operation 404, the method 400 sorts the extracted entities based on a sorting transform, as may be performed by the entity sorting module 314 of FIG. 3. In general, various sorting transforms may be used by example embodiments. For example, in some embodiments, operation 404 may first calculate an average entity length for the extracted entities. The operation 404 may then sort the entities smallest to largest, but if the length of a particular entity is less than the average entity length, then that entity is placed at the very bottom of the list. Entities placed on the bottom of the list in this way are sorted by length. Using the average entity length is just one example. Other mathematical properties may be used, such as a mean or standard deviation. Further, a constant entity length (e.g., 3, 4, 5, etc) may be used.

At operation 406, the method 400 organizes the sorted entities into groups based on a first matching criterion of a matching transform, as may be performed by the entity matching module 312 of FIG. 3. For example, the matching transform performed by the entity matching module 312 may select an entity from the sorted entities and then compare the selected entity with each remaining entity to calculate respective similarity values for each of the remaining entities. The selected entity and the remaining entities with a similarity value that meets a similarity threshold are then associated with a group. As is explained in further detail below, the steps of selecting an entity and then finding similar entities may be repeated for all the entities not already associated with a group until all the entities are associated with a group.

In some embodiments, the matching transform may break the entities into subgroups based on entity type. An entity type characterizes a type for the entity, such as a company, product, person, place, or any other conceptual type.

At operation 408, the method 400 may split the master entity of each group from the subordinate entities of that group, as may be performed by the group splitting module 316 of FIG. 3. It is to be appreciated that splitting the master entity from the subordinates may be performed in any suitable manner. For example, some embodiments may maintain a separate container (e.g., list, set, group, table, or the like) to store the master entity of each group. Such a container may be created by iterating over each group to identify the corresponding master entity. Once identified, the master entity may be placed in the container. In yet other embodiments, a master entity is split from the subordinates by maintaining an indication that a particular entity is a master entity. Such an indication allows the master entity to be accessed separately from the subordinate entities.

At operation 410, the method 400 uses a second comparison criterion to associate a first group with a second group. For example, the second comparison criterion may compare the master entities identified at operation 408 to determine which master entities are similar to each other. As described above, two master entities may be similar to each other when the master entities have a common substring. For example, as described above, the entity "CAR" and the entity "CARS" may be similar because they both share the "CAR" substring.

At operation 412, the method 400 may determine that a first entity is related to a second entity based on the association between the two or more groups. For example, when two master entities are determined to be similar at operation 410, the groups associated with the master entities may be merged to form a single group. Further, when two groups merge, a master entity is determined for the merged group (e.g., the entity with the longest length). Once two or more groups are merged, the entities that form the merged group may represent an entity cluster.

Entity clusters may be used to de-duplicate similar entities extracted from the one or more data sources. For example, an entity cluster may indicate that the data sources may relate to the topic "CAR," whereas typical entity extraction may indicate that the data sources may relate to the topics "CAR" and "CARS," even when such topics are similar. Such simplification of the entities may be useful in a number of data service jobs, such as voice-of-the-customer entity clustering and co-occurrence entity cluster, which are described below.

Figure 4B:
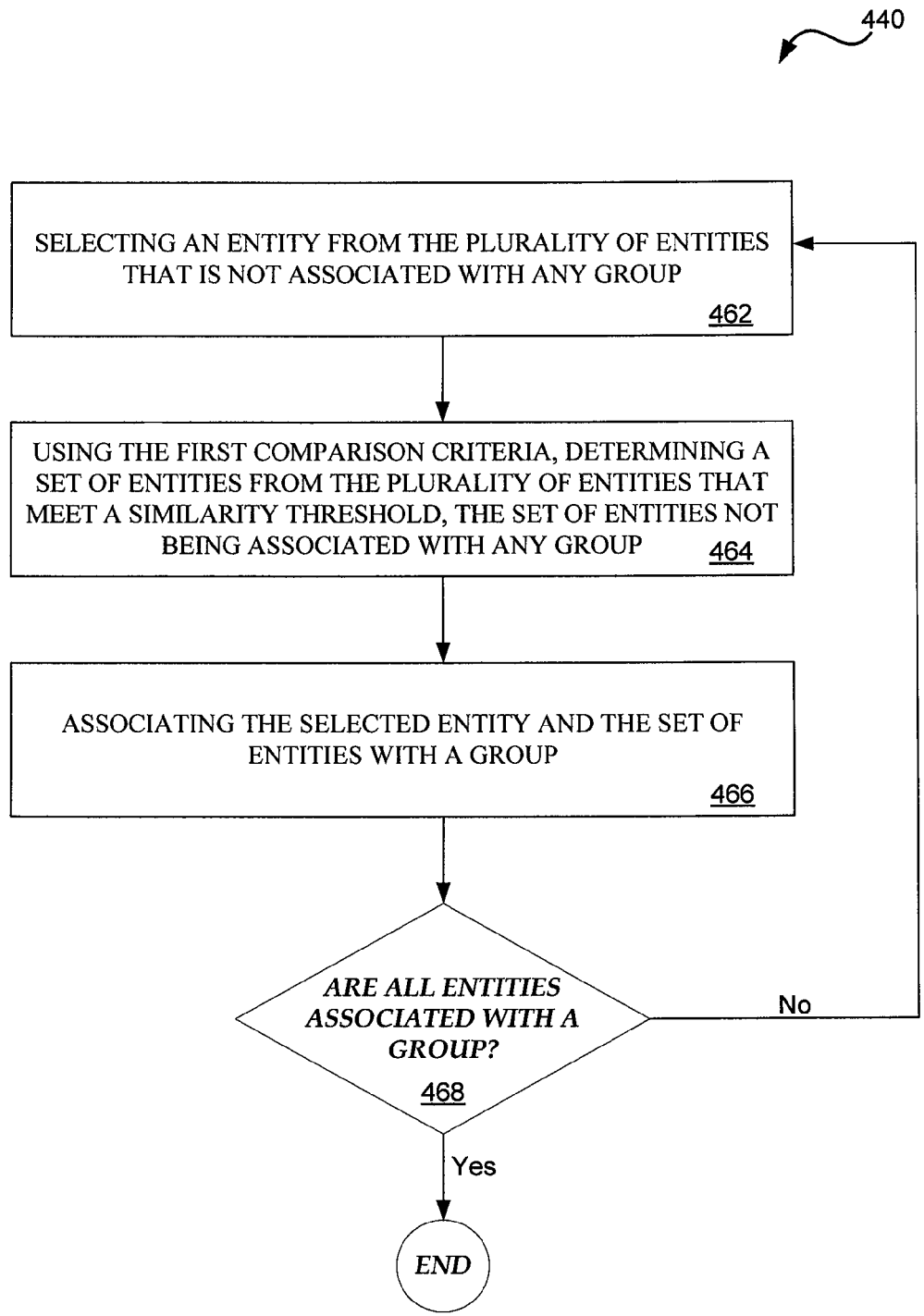
FIG. 4B is a flowchart illustrating an example method for organizing entities in groups, in accordance with an embodiment.

FIG. 4B is a flowchart illustrating an example method 440 for organizing entities in groups. In particular, the method 440 may be a method of performing operation 406 of FIG. 4A. In some embodiments, method 440 may be performed using the modules of the entity clustering system 210 shown in FIG. 3, such as the entity matching module 312.

The method 440 may begin at operation 462 when an entity is selected from the plurality of entities. With regard to operation 406 of FIG. 4A described above, the plurality of entities may additionally have been sorted according to a sorting length. Accordingly, in some embodiments, the entity selected at operation 462 may be the first entity in the sorted entity data set. "CUP HOLDER" is an example of the selected entity.

At operation 464, the entity matching module 312 may use first comparison criteria to determine a set of entities from the plurality of entities that meet a similarity threshold relative to the selected entity. For example, the entity matching module 312 may use heuristics to determine that "CAR CUP HOLDER" and "CUP HOLDER" are sufficiently similar (e.g., the similarity score meets or exceeds a determinable threshold). In some embodiments, the set of entities are compared if they have not yet been associated with a group. This comparison between the selected entity and the entities not yet associated with a group may continue until all the entities not yet associated with a group are compared with the selected entity.

At operation 466, the entity matching module 312 may associate the selected entity and the set of entities with a group. For example, the entities "CAR CUP HOLDER" and "CUP HOLDER" may be associated with a group identifier.

Then, at decision 468, the method ends if all the entities are associated with a group; otherwise, the method continues at operation 442.

The method 440 illustrates that the order of the sorted entities may affect the grouping formed by a matching transform. This is because, when forming groups through the match transform, entities are selected from the top of the entity data set.

Voice of the Customer Entity Clustering

The concept of forming entity clusters, as described above, may be used in one data service job to analyze customer feedback. Customer feedback can be analyzed using the Voice of the Customer (VOC) rules that cause the entity extraction module 310 of FIG. 3 to extract nouns like "CUP HOLDER", "CUP HOLDERS" and "PASSENGER CUP HOLDERS". At a high level, an end-user might not care whether or not the entity is plural or that the entity contains additional adjectives. Instead, an end-user may simply want to view all feedback about cup holders. However, creating a dictionary in these scenarios may be difficult.

Figure 5:
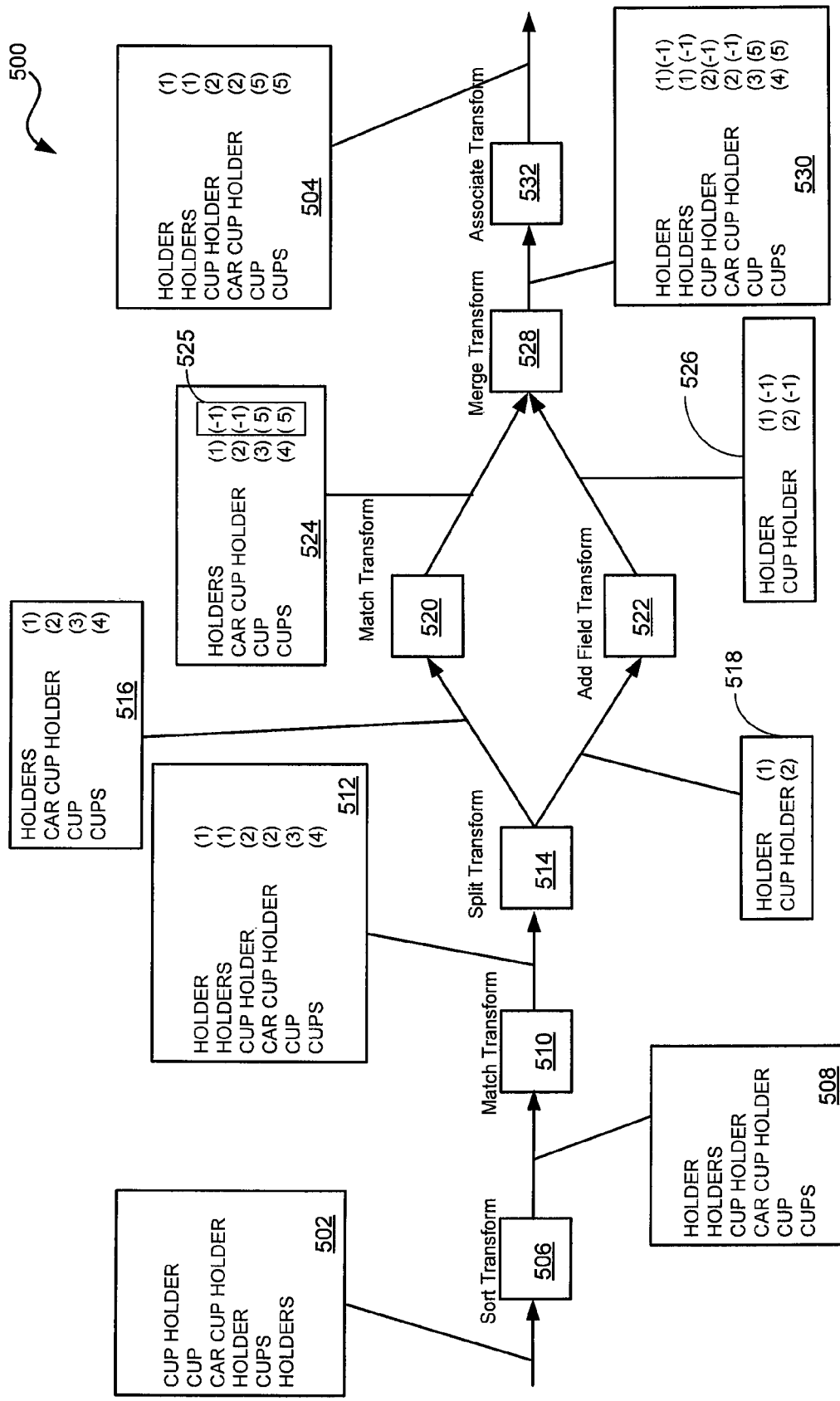
FIG. 5 is a data flow diagram that illustrates, in accordance with an embodiment, a data flow for forming entity clusters from groups of entities related to topics of voice of the customer data.

FIG. 5 is a data flow diagram that illustrates a data flow 500 for forming entity clusters from groups of entities related to topics of VOC data, as may be performed by example embodiments described herein. In general, the data flow 500 seeks to cluster the topics extracted from one or more data sources into high level groupings that allow easy exploration of the customer's feedback. For example, rather than providing separate topics for entities such as "CUP HOLDER," "CUP HOLDERS," and "PASSENGER CUP HOLDERS," such topics may be associated with a single group. In this way, the topic cluster may reduce the number of topics extracted from the VOC data.

As FIG. 5 shows, the data flow 500 involves a series of transforms that chained together to process an extracted entity data set 502 to form an entity cluster 504. It is to be appreciated that the transforms discussed with respect to FIG. 5 may be performed by the modules shown and discussed with respect to FIG. 3.

To begin, the entity sorting transform 506 (as may be performed by the entity sorting module 314 of FIG. 3) may receive the extracted entity data set 502. The extracted entity data set 502 may represent a list of topics extracted from one or more data sources by the entity extraction module 310. The entity extraction module 310 may be configured to find sentiments, problems and requests expressed by the customer and the topics (nouns) associated with them. As FIG. 5 shows, the extracted topics may include the following topics: CUP HOLDER, CUP, CAR CUP HOLDER, HOLDER, CUPS, and HOLDERS.

Once received, the entity sorting transform 506 may then sort the extracted topics. In some embodiments, the topics are sorted based on a sorting length that is, in turn, calculated from the average length of the entities in the extracted entity data set 502. In general, the entities are sorted smallest to largest, but if the length is less than the average length, then those entities are placed at the very bottom of the list, sorted by length. It is to be appreciated that using the average length is simply a guide. For example, some embodiments may use different sorting lengths, which may depend on the language (e.g., if the language of the extracted terms is German, a larger sorting length may be employed).

FIG. 5 shows an example sorted entity data set 508 that may be generated from the entity sorting transform 506. For clarity of description, a sorting length of 5 has been selected for FIG. 5. However, other sorting lengths are possible, as described above, such as a sorting length equal to the average entity length. In sorting the extracted entity data set 502, the entities "HOLDER," "HOLDERS," "CUP HOLDER," and "CAR CUP HOLDER" are longer than the sorting length of 5. Accordingly, the terms "HOLDER," "HOLDERS," "CUP HOLDER," and "CAR CUP HOLDER" are sorted in non-decreasing order at the top of the sorted entity data set 508. Further, FIG. 5 shows that the entities "CUP" and "CUPS" are sorted in non-decreasing order after the entities "HOLDER," "HOLDERS," "CUP HOLDER," and "CAR CUP HOLDER." Such may be the case because the entities "CUP" and "CUPS" may have a length that is shorter than the sorting length.

The entity matching transform 510 then breaks the sorted entity data set 508 into a group data set 512 based on a comparison criteria. As described above, the entity matching module 312 of FIG. 3 may be configured to use a match transform to break an entity set into groups of presumably similar entities. Thus, the match transform may be used to de-duplicate data. In some embodiments, the match transform may use heuristics so that the entities do not need to match exactly. A match transform may be configured to obtain entities in the form of rows and then output the rows with a group indicator that associates the entities with a group. A column with a group number is an example of a group indicator.

FIG. 5 shows that the output of the match transform 510, the group data set 512, associates each of the entities with a group, as shown by the numbers in the second column. For example, the entities "HOLDER" and "HOLDERS" are associated with the same group, group (1), while "CUP HOLDER" and "CAR CUP HOLDERS" are associated with the another group, group (2). Such may be the case because "HOLDER" and "HOLDERS" match up to a particular threshold value, as may be determined by the heuristic used by the match transform 510. The remaining entities (i.e., "CUP" and "CUPS") are the only entities associated with their respective groups. This may be because these entities are not high quality matches with any other entity, based on the heuristics used by the matching transform.

Once the entities are grouped, the split transform 514 then splits the master entities from the subordinate entities. As described above, a master entity may be a highest ranking member of a group (e.g., the longest entity of the group). Splitting the master entities from the subordinate entities allows the master entities to be processed by another matching module. Otherwise, in some embodiments, the associate transform (described below) will connect the two sets of groups in such a way that the outcome will be as if only the second match transform 520 was performed.

Once the master and subordinate entities are separated, the master entities 516 are sent to the second match transform 520 and the subordinate entities 518 are sent to an add field transform 522. As FIG. 5 shows, the master entities 516 and the subordinate entities 518 may retain the group indicators generated by the first match transform 510.

Similar to the first match transform 510, the second match transform 520 may break the master entities 516 into groups based on a matching criterion. However, the second match transform 520 may be configured to use different heuristics than the first match transform 510. For example, in one embodiment, the second match transform 520 may use a lower match threshold. The lower match threshold may reduce the number of groups by matching master entities such as "CUP" and "CUPS."

FIG. 5 illustrates that the output of the second match transform 520 is a master entity group data set 524. The master entity group data set 524 may include the original grouping information generated from the first match transform 510. Additionally, the master entity group data set 524 also includes further group indicators 525. It is to be appreciated that a negative value may indicate that no match was found. Thus, both "HOLDERS" and "CAR CUP HOLDER" do not match with any other master entity. However, "CUP" and "CUPS" are shown to match and, as result, are associated together in group (5). It is to be appreciated that the groupings formed by the second match transform 520 as shown in FIG. 5 are provided by for the purpose of illustration. Other groupings may be formed, as may be determined by the matching criteria used by the second match transform 520.

With regard to the subordinate entities, the add field transform 522 may update the subordinate entities 518 to be consistent with the output of the second match transform 520. For example, the add field transform 522 may add another set of grouping information to the subordinate entities 518. Because the subordinates are not part of a second matching transform, the grouping information of the updated subordinate data set 526 may indicate that no groups are formed (e.g., (−1) group or any other null value).

The outputs of the second match transform 520 and the add field transform 522 are then merged back into a single data set by the merge transform 528. The merge transform 528 may organize the entities based on the grouping information of the first match transform. In some embodiments, the merge transform is a union operation of the outputs of the match transform 510 and the add field transform 522. The output of the merge transform 528 is shown as data set 530.

The associate transform 532 then operates on the data set 530 to merge together the groups identified by the first and second match transforms 510, 520. In some embodiments, the associate transform 532 may be configured to find overlaps in groupings. For example, if two entities share the same primary grouping, then the two entities are associated with each other. Additionally, if two entities share the same secondary grouping, then the two entities are also associated with each other. According to FIG. 5, "HOLDER" and "HOLDERS" form one group, "CUP HOLDER" and "CAR CUP HOLDER" form another group, and "CUP" and "CUPS" form yet another group.

The output of the associate transform 532 may form the topic clusters for the VOC data. For example, a VOC topic cluster data service job may output the topics for the VOC based on the association of the entities. The VOC topic cluster data service job, for example, may select one entity from each of the associated groups. To illustrate, the VOC entity cluster data service job may indicate that, based on the extracted entities, the topics include: "HOLDERS," "CUP HOLDERS," and "CUP." Such clustering improves prior art systems that may simply output the extracted entities, such as: "CUP HOLDER," "CUP," "CAR CUP HOLDER," "HOLDER," "CUPS," and "HOLDERS."

Co-Occurrence Clustering

Voice of the Customer entity clustering, as described above, is an example of one possible data service job. An example of another possible data service job is a data service job that clusters co-occurrence entities. As used herein, "co-occurrence entities" may refer to entities (e.g., terms) that frequently occur together, such as side by side, possibly in a certain order. A first name and last name of a person are examples of co-occurrence entities because a person may often times be referred by their full name. However, a person is not always referred to with a full name. Instead, a person may be referred by a first name, last name, nickname, or the like. So you might have multiple people whose first name is "JOHN" appearing within the same document.

FIG. 6 is a diagram showing documents 600 that contain unstructured textual data. Typical textual analysis may extract the following entities from the documents 600: "JOHN SMITH," "MR. SMITH," "JOHNNY," "JOHN," and "JOHNNY SMITH." It is to be appreciated that even though the terms (e.g., words or phrases) of each of these entities may differ, one or more of these entities may refer to the same person. Thus, the typical textual analysis, if it provides the extracted entities, may confuse end user's of the system because the end user may have to then determine whether the reference to "MR. SMITH" refers to the same person as the reference to "JOHNNY SMITH." Such a determination may involve the end-user manually inspecting portions of the data source. In some embodiments, co-occurrence entity clusters may simplify the analytics of the entities returned from textual analysis of one or more data sources.

To cluster co-occurrence entities, embodiments may perform a number of match transformations at different structural levels of one or more documents, such as sentences, paragraphs, and documents. For example, an embodiment may perform a first match transform on entities within the same sentence, a second match transform on entities within the same paragraph, and then a third match transform on entities across a number of documents. By matching first on sentence and then paragraph, embodiments may increase the possibility of finding an entity that contains both the first and last name that also has a high degree of probability that the person referred to by only their first or last name in a sentence or paragraph is the same person that is referred to by an entity that has both first and last name.

Figure 7:
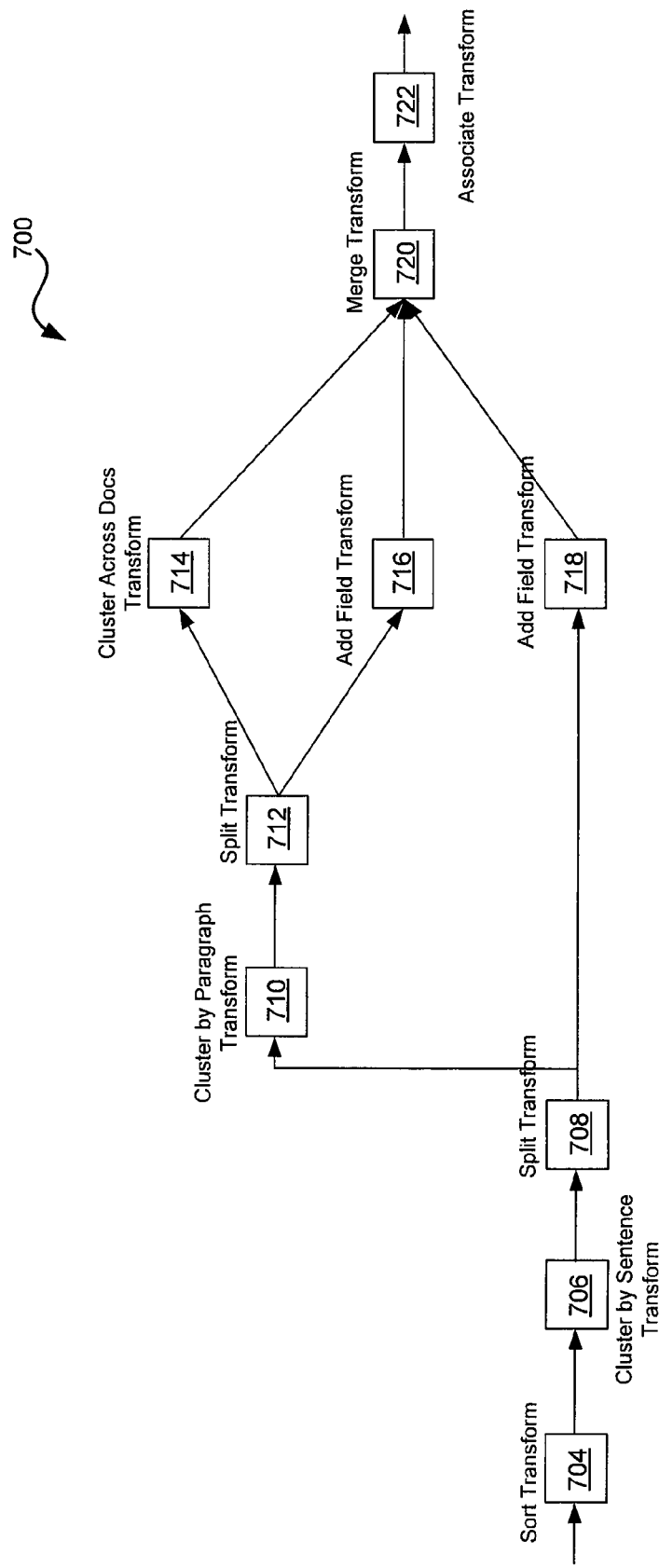
FIG. 7 is a data flow diagram showing a data flow for clustering co-occurrence entities, as may be performed by example embodiments.

FIG. 7 is a data flow diagram showing a data flow for clustering co-occurrence entities, as may be performed by example embodiments. The data flow 700 may begin by using the sort transform 704 to sort entities extracted from a number of documents.

Once the entities are sorted, a first match transform, a cluster by sentence transform 706, may then organize the entities into groups based on comparison criteria applied to entities from the same sentence. In some embodiments, to break entities by sentence, the comparison criteria may match entities based on a document identifier, a paragraph identifier, and a sentence identifier associated with the entity. Such may be the case where paragraph identifiers are not unique across documents and sentence identifiers are not unique across paragraphs. To avoid combining entities that relate to different entity types (e.g., a person or place), some embodiments may further break the entities by entity type, as well. Each group may be sorted using the custom sort length.

To illustrate the cluster by sentence transform 706, with reference to FIG. 6, extracting entities from the sentence "Mr. Smith is known by his colleagues as either Johnny or John" may result in the identification of the following entities: "MR. SMITH," "JOHNNY," and "JOHN." Each of the extracted entities may be associated with the same document identifier, the same paragraph identifier, and the same sentence identifier. Accordingly, the cluster by sentence transform 706 may use the match criteria to group these entities. Depending on the match criteria, the "JOHNNY" entity and the "JOHN" entity may be organized in the same group. Such may be the case because the "JOHNNY" and "JOHN" share a common substring (e.g., "JOHN") that makes up a significant portion of either entity. In the JOHNNY-JOHN group, "JOHNNY" may be designated as the master entity because it is the longer entity of the two. However, "MR. SMITH" may not be organized into a group with either "JOHNNY" or "JOHN" because these entities do not share any significant substring. The cluster by sentence transform 706 may perform a similar comparison to the other sentences of the documents 600. In one embodiment, the remaining entities may form groups of single entities because the remaining sentences only contain a single person entity.

With reference back to FIG. 7, after entities within the same sentences are grouped, a split transform 708 separates the master entities and the subordinate entities from each group. The subordinate entities are then applied to an add field transform 718. The add field transform 718 may be configured to add grouping information so that the format of the subordinate entities of the groups formed by the cluster by sentence transform 706 may be consistent with the groups formed later in the data flow 700. For example, the cluster by paragraph transform 710 and the cluster across documents transform 714 may add columns to data tables to store group identifiers. The add field transform 718 may add such columns to the subordinate entities of the groups formed by the cluster by sentence transform 706.

The cluster by paragraph transform 710 may use the master entities formed by the cluster by sentence transform 706 to form groupings of entities within paragraphs (e.g., entities that share a common document identifier and paragraph identifier). For example, with reference to FIG. 6, the master entities formed from the first paragraph may include: "JOHN SMITH," "MR. SMITH," "MR. SMITH," and "JOHNNY." Depending on the sorting length, these entities may be ordered according to: "MR. SMITH," "MR. SMITH," "JOHN SMITH," and "JOHNNY," based on a sorting length of 8.5 (the average length of the entities). Although some embodiments may be configured differently, the cluster by paragraph transform 710 may organize "JOHN SMITH," "MR. SMITH," and "MR. SMITH" as a single group because each of "MR. SMITH" and "JOHN SMITH" share a significant substring with "JOHN SMITH," the first entity in the sorted entity list. In such a group, because it is the longest entity, "JOHN SMITH" may be designated the master entity for the group, while the remaining entities may be designated subordinate entities. "JOHNNY" may be designated as a group with a single entity. The other paragraphs of the documents 600 may include MR. SMITH and JOHNNY SMITH as separate groups since their respective paragraphs do not include any other suitable person type entities.

With reference back to FIG. 7, similar to the output of the cluster by sentence 706, the output of the cluster by paragraph transform 710 may be applied to a split transform 712 that splits the master entities and the subordinate entities. The subordinate entities are then used as input to an add field transform 716 to put the subordinates in a form that can be merged with later groupings. For example, the add field transform 716 may insert one or more columns. Continuing with the example documents 600 of FIG. 6, the two occurrence of "MR. SMITH" in the first paragraph may be sent to the split transform 712.

The cluster across documents transform 714 uses the master entities formed by the cluster by paragraph transform 710 to identify high quality matches of entities found across documents. In some embodiments, the match criteria used by the cluster across documents transform 714 may use one or more criterion used in the prior match transforms. However, rather than breaking groups based on identifiers associated with paragraphs and sentences, the cluster across documents transform 714 breaks groups based on the entity type. That is, the cluster across documents transform does not break entities based on a paragraph or the sentence associated with the master entities.

Continuing the example using the documents 600, the cluster across documents transform 714 may receive "JOHN SMITH" and "JOHNNY" from the first paragraph of the first document, "MR. SMITH" from the second paragraph of the first document, and "JOHNNY SMITH" of the first paragraph of the second document, which, depending on the sorting length selected, may be ordered "JOHN SMITH," "JOHNNY SMITH," "JOHNNY," and "MR. SMITH," based on sorting length of 9.5 (e.g., the average entity length). In such a case, each of the entities may be organized as a single group because each entity shares a significant substring with "JOHN SMITH."

The groups formed by the cluster across documents transform 714 and the subordinate entities formed by the cluster by paragraph transform 710 and the cluster by sentence transform 706 are then merged by the merge transform 720. As described above, the merge transform 720 may be configured to organize all the master entities and subordinate entities as a single data set. The single data set may include grouping information created by each match transform (e.g., cluster by sentence transform 706, cluster by paragraph transform 710, and the cluster across documents transform 714).

The single data set is then used as an input to the associate transform 722. The associate transform 722 may associate together one or more groups formed by the matching transforms (e.g., cluster by sentence transform 706, cluster by paragraph transform 710, and the cluster across documents transform 714). In example embodiments, a first group is associated with a second group when the two groups share a common entity. Associating one group with another forms a co-occurrence entity cluster. Co-occurrence entity clusters may then be usable for any number of data service jobs, such as analytics, cleansing, and the like.

Example Computer Systems

Figure 8:
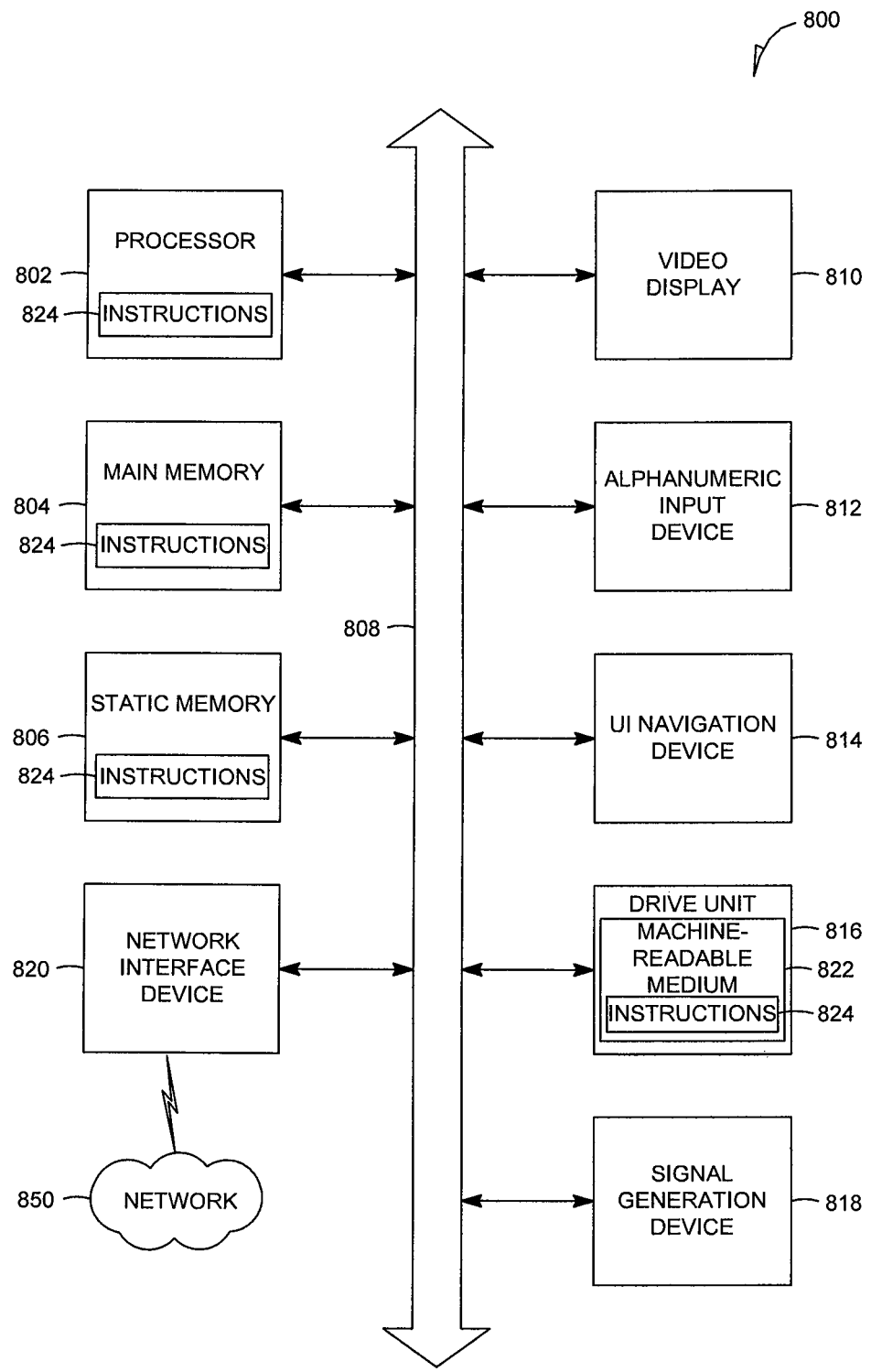
FIG. 8 depicts a block diagram of a machine in the example form of a computing device within which may be executed a set of instructions for causing the machine to perform any one or more of the methodologies discussed herein.

FIG. 8 depicts a block diagram of a machine in the example form of a computing device 800 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 800 includes a processor 802 (e.g., a central processing unit (CPU), a graphics processing unit (GPU) or both), a main memory 804 (e.g., random access memory), and static memory 806 (e.g., static random-access memory), which communicate with each other via bus 808. The computing device 800 may further include video display unit 810 (e.g., a plasma display, a liquid crystal display (LCD) or a cathode ray tube (CRT)). The computing device 800 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804 and/or within the processor 802 during execution thereof by computing device 800, with the main memory 804 and processor 802 also constituting machine-readable, tangible media.

The data structures and instructions 824 may further be transmitted or received over a computer network 850 via network interface device 820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 800) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 802 configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some example embodiments, the processors 802 may be located in a single location (e.g., within a home environment, an office environment or as a server farm), while in other embodiments the processors 802 may be distributed across a number of locations.

While the embodiment(s) is (are) described with reference to various implementations and exploitations, it will be understood that these embodiments are illustrative and that the scope of the embodiment(s) is not limited to them. In general, techniques for data searches using context information may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method comprising:

identifying, using one or more processors, a plurality of entities found in one or more data sources, each entity representing a word or a phrase found in the one or more data sources;

sorting the plurality of entities based on a sorting length, the sorting length being a value based on a function of an entity length of each of the entities, the sorting comprising:

sorting a first portion in non-descending order, the first portion including the entities that meet a length condition based on the sorting length, the length condition being based on one or more lengths of one or more of the extracted entities; and sorting a second portion in non-descending order, the second portion including the entities that do not meet the length condition based on the sorting length, the second portion being located after the first portion;

using a first comparison criteria, organizing the sorted plurality of entities into groups by selecting a first entity in the sorted plurality of entities and comparing the selected entity to one or more remaining entities of the sorted plurality of entities, each group identifying one of the entities as a master entity and a set of entities as subordinate entities;

using a second comparison criteria, associating a first group from the groups with a second group from the groups, the second comparison criteria comparing only a first master entity associated with the first group with a second master entity associated with the second group; and determining that a first entity is related to a second entity based on the association between the first group and the second group.

2. The method of claim 1, wherein the one or more data sources includes at least one of a document, a corpus, a file system, or a database.

3. The method of claim 1, wherein each entity is a row in a table, each row including a number of columns that identify at least one of a location, a group identifier, and an entity type.

4. The method of claim 1, wherein the first comparison criteria determines whether each master entity and the associated subordinate entities share a substring or similarity of characters.

5. The method of claim 1, wherein a particular master entity of a particular group is an entity from the particular group that is first selected from the plurality of entities to form the particular group, and subordinate entities of the particular group are entities from the plurality of entities that, when compared to the particular master entity, meet a similarity condition defined by the first comparison criteria.

6. The method of claim 1, wherein the organizing the plurality of entities into the groups further comprises breaking the entities into sub-groups based on an entity type.

7. The method of claim 1, wherein the first comparison criteria forms groups of entities within a sentence.

8. The method of claim 1, wherein the second comparison criteria forms groups of entities within a paragraph.

9. The method of claim 1, further comprising breaking one or more entities from the first group into a subgroup based on the one or more entities having a determinable morpheme.

10. The method of claim 1, wherein each entity is associated with feedback submitted by a customer.

11. The method of claim 1, wherein each entity is associated with a requirement submitted by a customer.

12. The method of claim 1, wherein the organizing of the groups includes a number of matching operations, the number of matching operations including:
- selecting an entity from the plurality of entities that is not associated with any group;
- using the first comparison criteria, determining a set of entities from the plurality of entities that meet a similarity threshold, the set of entities not being associated with any group; and
- associating the selected entity and the set of entities with a group.

13. The method of claim 10, wherein the number of matching operations are repeated to form other groups until all the entities are associated with a group.

14. A computer system comprising:
- at least one processor;
- an entity extraction module implemented by the at least one processor and configured to identify a plurality of entities found in one or more data sources, each entity representing a word or a phrase found in the one or more data sources;
- a sorting module implemented by the at least one processor and configured to sort the plurality of entities based on a sorting length, the sorting length being a value based on a function of an entity length of each of the entities, the sorting comprising:
  - sorting a first portion in non-descending order, the first portion including the entities that meet a length condition based on the sorting length, the length condition being based on one or more lengths of one or more of the extracted entities; and
  - sorting a second portion in non-descending order, the second portion including the entities that do not meet the length condition based on the sorting length, the second portion being located after the first portion;
- an entity matching module implemented by the at least one processor and configured to:
  - organize the sorted plurality of entities into groups using a first comparison criteria by selecting a first entity in the sorted plurality of entities and comparing the selected entity to one or more remaining entities of the sorted plurality of entities, each group identifying one of the entities as a master entity and a set of entities as subordinate entities;
  - associate a first group from the groups with a second group from the groups using a second comparison criteria that compares only a first master entity associated with the first group with a second master entity associated with the second group; and
- a group association module implemented by the at least one processor and configured to determine that a first entity is related to a second entity based on the association between the first group and the second group.

15. The computer system of claim 14, wherein the one or more data sources includes at least one of a document, a corpus, a file system, or a database.

16. The computer system of claim 14, wherein each entity is a row in a table, each row including a number of columns that identify at least one of a location, a group identifier, and an entity type.

17. The computer system of claim 14, wherein the first comparison criteria determines whether each master entity and the associated subordinate entities share a substring.

18. The computer system of claim 14, wherein a particular master entity of a particular group is an entity from the particular group that is first selected from the plurality of entities to form the particular group, and subordinate entities of the particular group are entities from the plurality of entities that, when compared to the particular master entity, meet a similarity condition defined by the first comparison criteria.

19. The computer system of claim 14, wherein the entity matching module is further configured to break the entities into sub-groups based on an entity type.

20. The computer system of claim 14, wherein the first comparison criteria forms groups of entities within a sentence.

21. The computer system of claim 14, the second comparison criteria forms groups of entities within a paragraph.

22. The computer system of claim 14, wherein entities from the first group are filtered into a subgroup based on the one or more entities having a determinable affix.

23. The computer system of claim 14, wherein each entity is associated with feedback submitted by a customer.

24. The computer system of claim 14, wherein each entity is associated with a requirement submitted by a customer.

25. The computer system of claim 14, wherein the entity matching module is further configured to perform a number of matching operations, the number of matching operations involves the matching module being configured to:
- select an entity from the plurality of entities that is not associated with any group;
- using the first comparison criteria, determine a set of entities from the plurality of entities that meet a similarity threshold, the set of entities not being associated with any group; and
- associate the selected entity and the set of entities with a group.

26. The computer system of claim 25, wherein the entity matching module is further configured to perform the number of matching operations to form other groups until all the entities are associated with a group.

27. A non-transitory computer-readable storage medium storing instructions for causing a processor to implement operations, the operations comprising:
- identifying a plurality of entities found in one or more data sources, each entity representing a word or a phrase found in the one or more data sources;
- sorting the plurality of entities based on a sorting length, the sorting length being a value based on a function of an entity length of each of the entities, the sorting comprising:
  - sorting a first portion in non-descending order, the first portion including the entities that meet a length condition based on the sorting length, the length condition being based on one or more lengths of one or more of the extracted entities; and
  - sorting a second portion in non-descending order, the second portion including the entities that do not meet the length condition based on the sorting length, the second portion being located after the first portion;
- using a first comparison criteria, organizing the sorted plurality of entities into groups by selecting a first entity in the sorted plurality of entities and comparing the selected entity to one or more remaining entities of the sorted plurality of entities, each group identifying one of the entities as a master entity and a set of entities as subordinate entities;
- using a second comparison criteria, associating a first group from the groups with a second group from the groups, the second comparison criteria comparing only a first master entity associated with the first group with a second master entity associated with the second group; and determining that a first entity is related to a second entity based on the association between the first group and the second group.

* * * * *